Sept. 1, 1953   J. K. NORTHROP ET AL   2,650,780
ALL-WING AIRCRAFT
Filed April 2, 1949   4 Sheets-Sheet 3

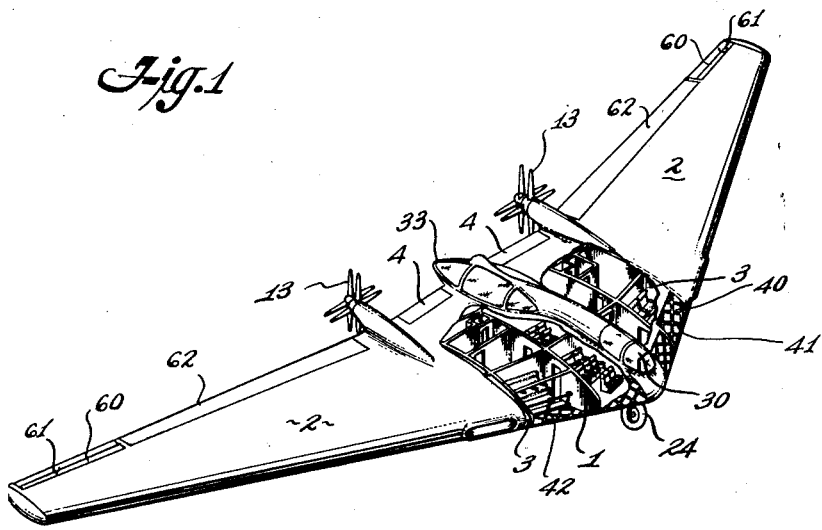
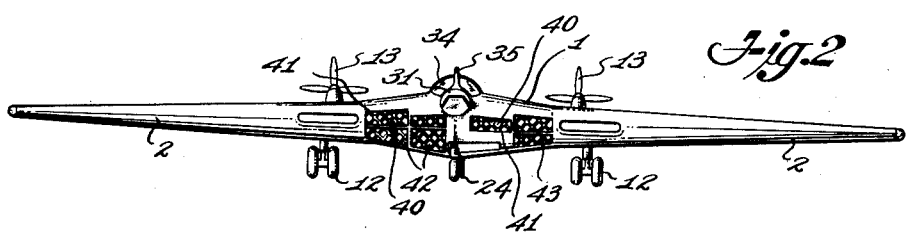
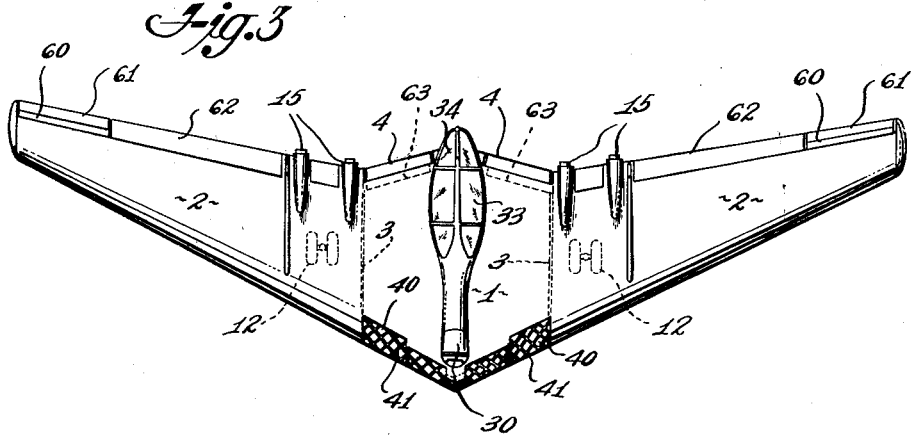

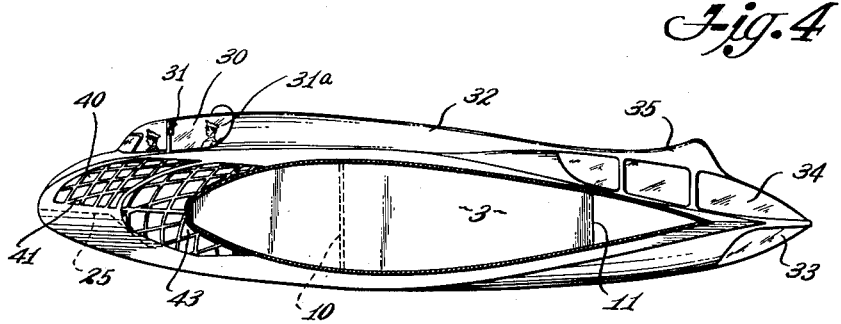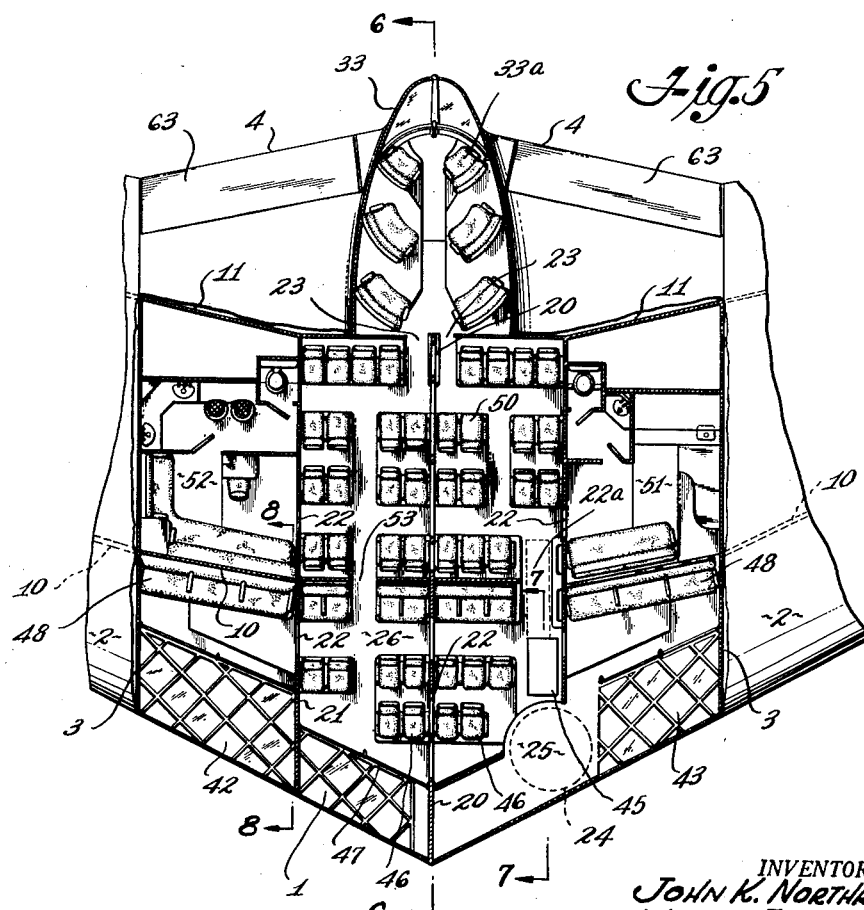

INVENTORS
JOHN K. NORTHROP
BY WALTER J. CERNY
Herbert E. Metcalf
Attorney

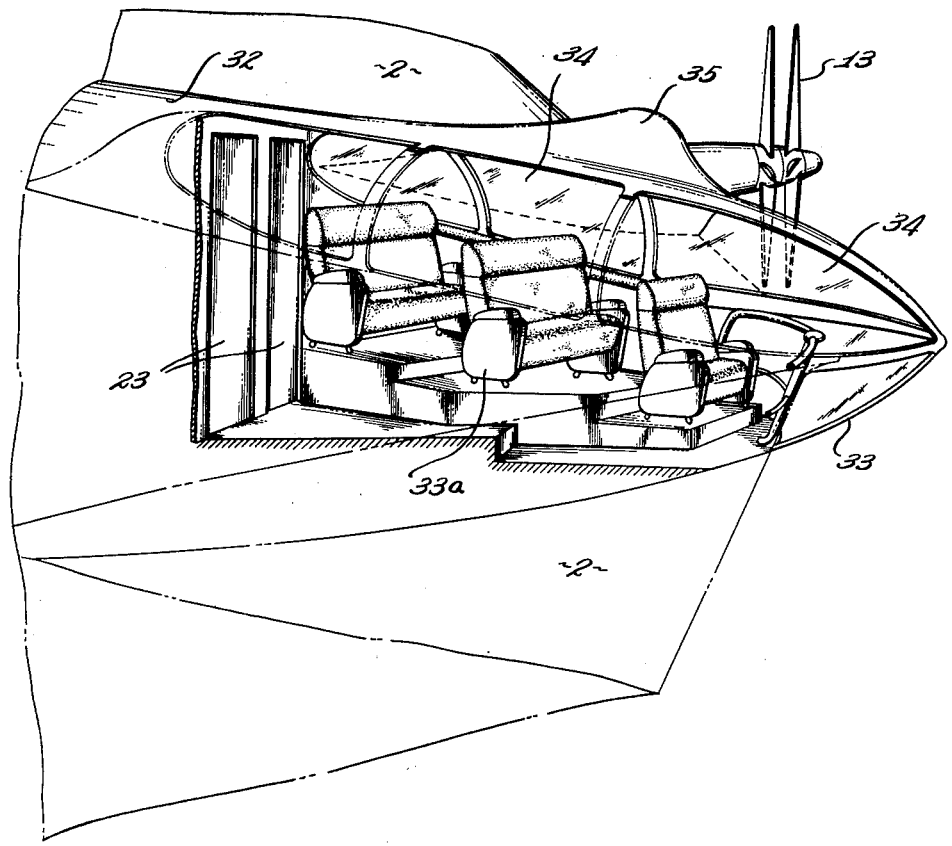

Patented Sept. 1, 1953

2,650,780

UNITED STATES PATENT OFFICE 2,650,780

ALL-WING AIRCRAFT

John K. Northrop, Pacific Palisades, and Walter J. Cerny, Los Angeles, Calif., assignors to Northrop Aircraft, Inc., Hawthorne, Calif., a corporation of California Application April 2, 1949, Serial No. 85,087

1 Claim. (Cl. 244—13)

The present invention relates to tailless airplanes of the Northrop type, and more particularly to tailless airplanes specifically designed to provide a maximum of connected space available for the transport of cargo and/or personnel.

An ideal all-wing or tailless airplane is defined as a type of airplane in which all of the functions of a satisfactory flying machine are disposed and accommodated within the outline of the main supporting airfoil.

In U. S. Patent No. 2,406,506, J. K. Northrop has shown, described and claimed in all-wing airplane, primarily adapted for military use, that closely approaches the ideal. Large all-wing airplanes embodying the principles set forth in the above identified patent have been built and successfully flown, as exemplified by the U. S. Air Force heavy bomber B-35, utilizing four pusher propellers for propulsion; and by the U. S. Air Force bomber B-49 utilizing jet propulsion furnished by eight turbo-jet engines. Both airplanes are substantially alike except for the propelling means and have a gross overload weight of about 210,000 pounds. These Air Force airplanes have a 172 foot span and are only 53 feet long, but have a habitable crew space at the root chord.

This crew space at the center line of the airplane is obtained because the all-wing airplanes referred to comprise two relatively thick sweptback wing panels having a uniformly varying chord and constant planiform taper, joined at the center line of the airplane.

Due to strictly military requirements, the abovementioned airplanes were primarily designed as bomb carrying airplanes, connected space and headroom only being required in a relatively narrow center section in which the military crew of fifteen are housed. The bombs, having a high unit density, are carried in separated bomb bays disposed laterally from the center section, between longitudinal bulkheads that are customarily solid.

When, however, an all-wing airplane is to be used for transport of cargo or personnel, with an additional requirement that the space to be loaded is to be connected and is to be to the maximum extent possible a place where sufficient headroom everywhere exists to permit personnel to move about, an entirely new structural problem is presented.

For example, the all-wing airplanes, B-35 and B-49, have a main frame comprising two spaced laterally extending main spars connected by bulkheads running fore-and-aft. The bulkheads are projected forwardly of the front spar to outline the leading edge area. However, due to various military requirements, no full central, or root chord, bulkhead could be utilized, and the nose landing gear, which transmits landing forces in these airplanes of over 155,000 pounds to the frame in the leading edge of the root chord, is attached to a short central box frame carrying the landing loads to other load-bearing frame members.

If, however, operational components can be removed from a central position within the wing, a strong center root chord truss can be then utilized in the airplane, with the nose gear transmitting its loads directly into this center truss, and through this truss to the spars. The center truss, being at the root chord of both wing panels at the center of the airplane is, of course, the largest fore-and-aft structural member in the airplane, and, as such, can be made strong enough to withstand landing stresses and still be sufficiently apertured to provide passageway therethrough at convenient intervals.

Placing nose gear landing loads primarily on a center truss also reduces loads on the more immediate outboard trusses, thereby permitting these trusses also to be apertured for passageways.

The main spars, in passing through the center section of the airplane are of such dimensions that they also can be apertured, thereby providing a relatively wide centrally located connected space within the wing wherein satisfactory headroom is obtained and in which, in an all-wing airplane conforming generally in dimensions to those of the B-35 and B-49, from sixty to eighty people can be accommodated according to the luxuriousness of the accommodations. This same space is available for cargo, with the advantage that the cargo can be loaded and stowed by personnel able to move freely within the space.

It is, therefore, an object of the present invention to provide a means and method of obtaining a maximum of intercommunicating space in the central portion of an all-wing airplane and to provide ample headroom within said space.

All-wing airplanes with swept-back wing panels require some measure of directional stability to prevent yawing and weather cocking of the airplane. In the Air Force bombers referred to, this stability is obtained in the B-35 by the effect of the pusher propellers and the propeller shaft fairings, and in the B-49 by the use of flow straighteners on the upper wing surface and small vertical fins on the trailing edges of each wing panel adjacent the jet engine exhausts. There is, therefore, from an aerodynamic standpoint no objection to the use of a vertical fin positioned directly over the root chord along the center line of the airplane, to provide directional stability. In consequence, it is possible to place the airplane crew, which is smaller in a transport airplane than in a military airplane, in a compartment above the center line of the airplane with a canopy projecting above the upper wing surface, and then to fair the crew canopy into a full-length central vertical fin. Thus, there is little loss of aerodynamic efficiency due to the new crew position and the center section is relieved of crew personnel and the required pilot's controls, to become available as usable transport space.

It is, therefore, another object of the present invention to remove the crew and the required airplane controls at least partly from within the wing contour without any substantial aerodynamic penalty and to thereby provide for a relatively large unobstructed transport space within the wing.

In addition, the space available with permissible minimum headroom in the center section of the airplane can be substantially enlarged by lengthening and thickening the root chord and the adjacent lateral chords, thereby increasing the headroom in the central area of the airplane. This, again, does not substantially impair the aerodynamic efficiency of the airplane, and as the central area can be of substantial width, the extra space gained adds a very significant volume to the available cargo and personnel space. This arrangement provides a center section having a swept-back leading edge and a swept-forward trailing edge, and when such a planform is used in conjunction with swept-back wing panels, it is preferred to make the sweep-back of the leading edge of both the center section and the wing panels the same, and continuous.

Furthermore, the taper ratios of the center section can be increased without substantial loss of aerodynamic efficiency and, therefore, in order to obtain maximum headroom throughout the connected space we prefer to increase the taper ratios of the center section above that of the adjoining wing panels.

It is still another object of the present invention to provide a means and method of modifying the basic planform of an all-wing airplane to provide a center portion having a maximum of space with desired headroom without occasioning any substantial aerodynamic penalty.

In broad terms, the present invention includes the use, in an all-wing airplane, of a center section having a different taper in plan and chord thickness than those that exist in attached wing panels. The invention also includes a center wing root apertured truss, to which a nose gear may be attached, together with parallel trusses, also apertured, these trusses being joined by the main spars of the airframe which can, because of their thickness, also be apertured in the center section of the airplane, thereby providing a substantial connected space within the outline of the main airfoil for use as cargo or personnel space and in which, for example, a minimum of 5½ feet of headroom can be obtained when maximum headroom is 7½ feet, all above a space floor. The invention also includes the use of a transparent skin at the forward portion of this space, and a rear nacelle with a transparent canopy forming a continuation of the transport space. In addition, the crew compartment, mounted on the center truss, is streamlined by a central fin aiding in the stabilization of the airplane.

The present invention will be more fully understood by reference to the drawings, in which:

Figure 1 is a top perspective view of an all-wing propeller driven passenger transport embodying the present invention, with the upper surface of the airplane cut away over the center section to show the interior thereof.

Figure 2 is a front view of the airplane shown in Figures 1 and 3 in ground configuration.

Figure 3 is a top plan view of a jet driven transport having substantially the same airframe as the airplane of Figure 1.

Figure 4 is a view looking toward the center of the airframe, beginning at the bulkhead at the junction of center section and the wing panels.

Figure 5 is a top plan view of a preferred passenger seating arrangement in the center section of the airplanes of Figures 1 and 2.

Figure 9 is a perspective view looking outwardly from one side of the center line of the tail cone of the airplane of Figure 1 to show one-half the seating arrangement and part of the opposite wing.

Figure 6:
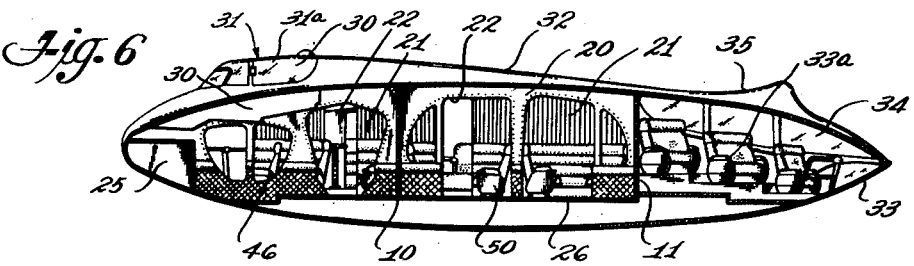
Figure 6 is an elevational side view of the center truss in the airplanes of Figures 1 and 2.

In the following specification a distinction is made between the term "truss" which is used to designate a longitudinal fairly open load-bearing framework and the term "bulkhead" which is usually, although not necessarily, a longitudinal solid member having few or only small apertures therein.

Referring first to the gross aspects of a specific airplane embodying the present invention as shown in Figures 1, 2 and 3, the main airframe in both instances comprises a cargo or passenger carrying center section 1, 36 feet wide, having joined thereto swept-back wing panels 2, each 68 feet in extent. A preferred sweep-back angle of the leading edge of both central section and wing panels is 27° and the leading edges of both are coextensive.

The overall span is 172 feet, and the taper ratio in plan of the wing panels only is about 1 to 3.4 with a 6 foot maximum chord thickness at the wing panel bulkheads 3 separating the central section 1 from the wing panels 2. The length of the wing panel chord at the wing panel bulkheads is 24½ feet. The taper of the wing panels in chord thickness is also about 1 to 3.4.

The length of the center or root chord of the airplane, i. e., the length from nose to trailing edge along the airplane center line is 44.5 feet, thereby providing swept-forward trailing edges 4 in the center section. The plan taper of the center section is about 1 to 1.4.

The center section itself has a much lower thickness taper than that of the wing panels, i. e., about 1 to 1.38, thereby providing a maximum root chord thickness of over 8 feet providing for a full 7 foot maximum headroom above a floor. Thus, fore-and-aft, a central space 32 feet long along the center line is provided and laterally a central section extent of 36 feet is Less desirable seating accommodations can seat up to eighty-five people in the space provided.

The flight controls of the airplane above described are similar to those used on the U. S. Air Force bombers referred to and comprise, as shown in Figures 1 and 3, a pair of wing tip trim flaps 60 having separable portions 61 to create unilateral drag for directional control, large elevons 62, one on each wing panel 2 and lower surface landing flaps 63 beneath the propeller fairings or jet pipes and beneath the center section 1 on each side of the tail cone 33. The speed of the airplanes built in accordance with the present invention will, of course, vary with installed engine power, but will be in the 400 to 500 M. P. H. range.

Summarizing, pertinent dimensions of a specific embodiment of the present invention are as follows:

| | |
|---|---|
| Length at central truss 20 to rear door openings 23 | 32 ft. |
| Length of central space at outboard trusses 21 | 27½ ft. |
| Length of central space at wing panel bulkheads 3 | 24½ ft. |
| Width of central space between wing panel bulkheads 3 | 36 ft. |
| Maximum headroom at central truss | 7 ft. |
| Maximum headroom at wing panel bulkhead | 6 ft. |
| Headroom at rear door openings 23 | 6½ ft. |
| Minimum headroom at rear of wing panel bulkheads | 5 ft. 8 in. |
| Length of tail cone | 15 ft. |
| Headroom in tail | 6 ft. |
| Center section: | |
| Taper ratio of planiform | 1 to 1.4 |
| Taper of wing section thickness ratio | 1 to 1.38 |
| Wing panels: | |
| Taper ratio of planiform | 1 to 3.4 |
| Taper of wing section thickness ratio | 1 to 3.4 |

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute, the invention has been described in language more or less specific as to structural features, it is to be understood that the invention is not limited to the specific features shown, but that the means and construction herein disclosed comprise the preferred form of one mode of putting the invention into effect, and the invention is therefore claimed in any of its forms or modifications within the legitimate and valid scope of the appended claim.

What is claimed is:

An all-wing transport airplane comprising: a center section having a relatively low taper ratio in plan and chord thickness with swept-back leading edges and swept-forward trailing edges; a wing panel joined to said center section on each side thereof, said wing panels having swept-back leading and trailing edges with a substantially lower taper ratio in plan and chord thickness than said center section, the leading edge of each said wing panel being a straight-line extension of the swept-back leading edge of said center section; main airframe structural members within said center section comprising a plurality of laterally-extending spars and longitudinally-extending trusses, said spars and trusses being apertured to provide a central connected space between said wing panels usable substantially in its entirety for passenger or cargo transport, said trusses including a central vertical truss in the center-line plane of said airplane; a separate crew compartment considerably narrower than said center section mounted on said central truss and projecting above said center section substantially entirely outside of said space and somewhat aft of said center section leading edge; a thick central fairing extending behind said compartment atop said center section, said central fairing widening out as it reaches the rear half of said center section to provide additional head space therein; and a tail cone faired into the rear of said central fairing and extending aft beyond the trailing edge of said center section and above and below the normal airfoil lines of said center section.

JOHN K. NORTHROP.
WALTER J. CERNY.

References Cited in the file of this patent

UNITED STATES PATENTS

| Number | Name | Date |
|---|---|---|
| 1,806,586 | Christmas | May 26, 1931 |
| 1,845,520 | Robinson | Feb. 16, 1932 |
| 2,194,596 | Henter | Mar. 26, 1940 |
| 2,224,641 | Burnelli | Dec. 10, 1940 |
| 2,281,673 | Burnelli | May 5, 1942 |

FOREIGN PATENTS

| Number | Country | Date |
|---|---|---|
| 545,909 | Great Britain | June 18, 1942 |
| 575,538 | Great Britain | Feb. 21, 1946 | provided with a headroom of 7 feet maximum and 5½ feet minimum over a floor.

All of this central space can be interconnected by properly designing the spars and trusses passing through the central space, and by removing the crew substantially entirely from the central section. This frame arrangement is shown in Figures 4 to 9 inclusive.

Referring next to Figure 5, the main lateral load-bearing members in the wing panels 2 are two spaced wing panel spars, a forward spar 10 and a rear spar 11. These spars are connected in the wing panels by various fore-and-aft bulkheads, as is customary in airframe practice. The wing panels 2 also house the lateral landing gears 12 of a tricycle system, as indicated in Figures 2 and 3 and also support and enclose the reciprocating or turbo-prop engines (not shown) driving propellers 13, as shown in Figure 1, or the turbo-jets (not shown) exhausting through tail pipes 15, as shown in Figure 3. All gas tanks and operational equipment, other than crew controls and instruments, are carried solely in the wing panels 2.

The two main spars 10 and 11 of each wing panel are continued across the central space 1, the rear spar 11 providing the rear wall of the central space. The forward spar 10 also passes through the central space, and substantially bisects it. Both front and rear spars meet at the root chord, and are there joined to a heavy central root chord truss 20 extending in cantilever fashion forward to the nose of the airplane from the front spar. This central truss 20 is apertured, as shown in Figures 5, 6 and 7, to provide free lateral communication therethrough.

Between each wing panel bulkhead 3 and the central truss 20 is positioned a parallel truss 21 also apertured, with passageways 22 connecting the spaces on each side of the trusses 21. The length of the central space at these trusses is 27½ feet.

Front spar 10 is provided with door openings 22a on each side of central truss 20, and the rear spar 11 is provided with closely adjacent door openings 23 close to the junction of the central truss 20 and the rear spar 11.

Figure 7:
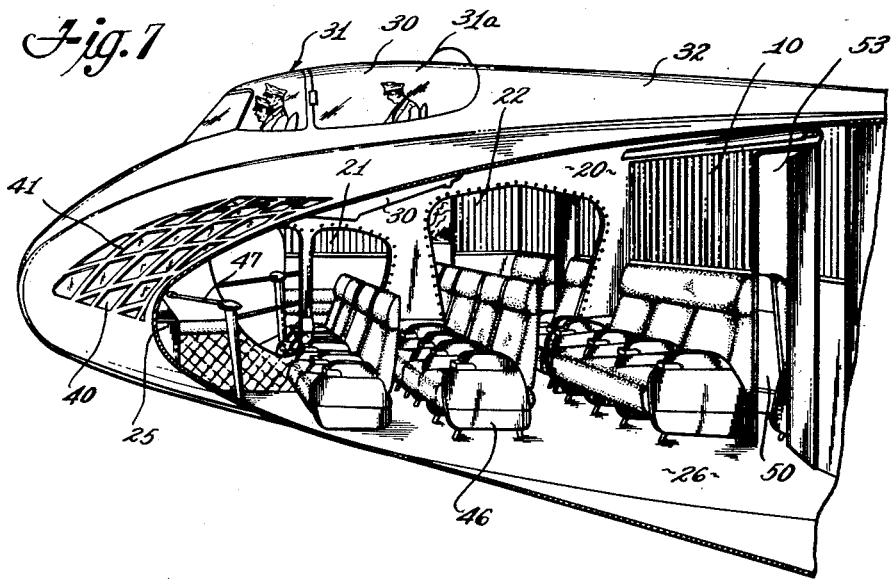
Figure 7 is a side perspective view of the central section of Figures 1 and 2 with the first laterally displaced truss removed to show the central truss cutouts.
Figure 8:
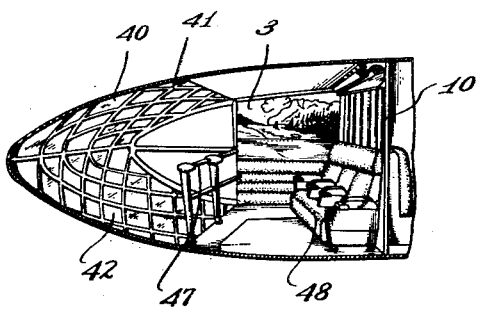
Figure 8 is a perspective view looking outwardly from the plane of the first laterally displaced truss.

A nose gear 24 forming the central forward unit of the tricycle landing gear for the airplane is pivoted directly on the central truss 20, below the airplane near the nose thereof, folds laterally by mechanisms well-known in the art, and requires only a small stowage space 25 below the center line and at one side of the center line, as shown in Figures 5, 6 and 7. The floor 26 of the central space 1 extends throughout the central space so far described with a slight downjog near the leading edge, as shown in Figure 6.

As is customary in airplane construction, the upper and lower center section skins are supported by stiffeners (not shown) connecting the forwardly extended trusses 20 and 21, spars 10 and 11 and bulkheads 3. Similar stiffeners also support the floor 26 and ceiling panels if used.

As shown in Figures 4, 6 and 7, a crew compartment 30 is forwardly supported on the central truss, part of this compartment 30 protruding downwardly into the central space 1 on each side of the central truss back of the nose, with the upper portion of the compartment formed as a transparent canopy 31. This downward protrusion is close to the center line and small, so that central headroom is not deleteriously reduced. All of the crew for the flight control of the airplane is carried in the compartment 30, together with all of the necessary engine and flight controls, the latter being led to the wing panels 2 along the ceiling of the central space 1. Provision is made for pilot, co-pilot and flight engineer, who can enter the compartment through a hinged portion 31a of the canopy 31 for example.

As the crew compartment extends above the top surface of the airplane, it is rearwardly faired by a relatively thick central fin 32 extending aft, widening at the base as the chord width starts to decrease, to be formed into a tail cone 33 having the upper portion 34 thereof transparently covered. The upper portion of the central fin is continued as a narrower tail fin 35 on the upper portion of the tail cone. The trailing portion of the central wing section substantially horizontally bisects the tail cone, which is forwardly faired into the central section upper and lower wing contours of the airplane.

The space enclosed by the tail cone is accessible through the adjacent rear door openings 23 in the rear spar, with ample door headroom for passage.

The entire leading edge above the central section extending laterally to the wing bulkheads on both sides is proved with a transparent upper skin 40 held by metal cross-members 41 to the trusses 20, 22 and 3, as best shown in Figure 3. The lower leading edge on one side from the nose to the wing panel bulkhead is also provided with a lower transparent skin 42. On the opposite side only a short portion 43 of the lower skin can be made transparent, due to the position of the nose gear stowage space 25, as best shown in Figure 4.

Thus, there has been provided a large central connected space in an all-wing airplane suitable for loading cargo and/or passengers. As this space is bounded laterally by the solid wing panel bulkheads 3 and otherwise by airtight skins, metal or transparent, the entire space, including the interior of the tail cone, can be air conditioned and pressurized for high altitude flight, using well-known heating, cooling and pressurizing means.

Access to the central space is through a lower loading panel 45 (Figure 5) close to one lateral truss, this panel swinging downwardly for passenger or cargo loading. As is usual with such panels, the skin is sealed around the panel when closed to maintain pressure in the central space.

One preferred passenger seating arrangement is shown in Figures 5, 6, 7, 8 and 9. Three laterally displaced parallel rows of seats 46 are positioned between the front spar 10 and the nose, with a rail 47 protecting too close an approach to the transparent leading edge portions 40, 42 and 43. This seating provides for eighteen passengers. Lateral couches 48 seating twelve are provided between trusses 21 and the wing panel bulkheads 3. Back of the front spar 10 and between the central and outboard trusses are provided seats 50 for thirty-one people. Space between the front and rear spars outside of the outboard trusses serve for men's lounging room and bar 51 and women's lounge 52 having space for about five or more to be seated. The tail cone 33 seats ten in tail cone seats 33a, as indicated by the seats shown in Figures 5 and 9, these seats being reached through door openings 23. Aisles are also provided in line with lateral openings 53 in the front spar.

Thus, in the seating arrangement shown, more than seventy-six people can be accommodated.